Aug. 19, 1947.  V. R. CLARK  2,425,785
MEANS FOR AND METHOD OF APPLYING MULTIPLE-BELTS
Filed June 24, 1943  2 Sheets-Sheet 1
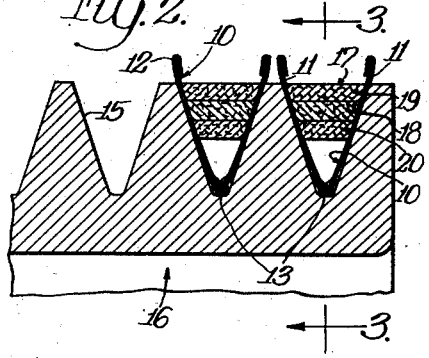
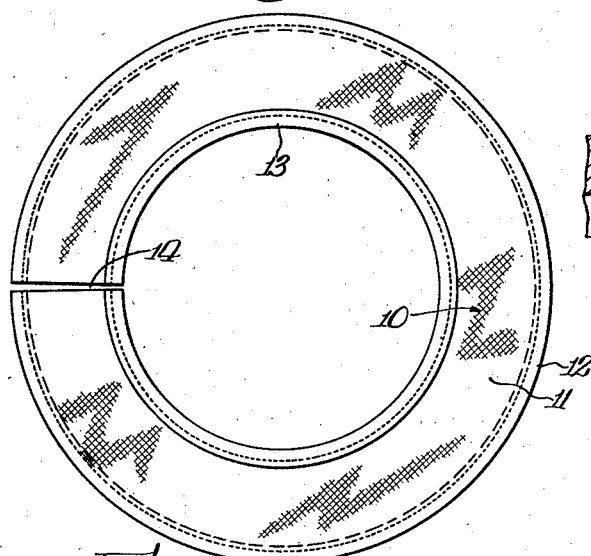
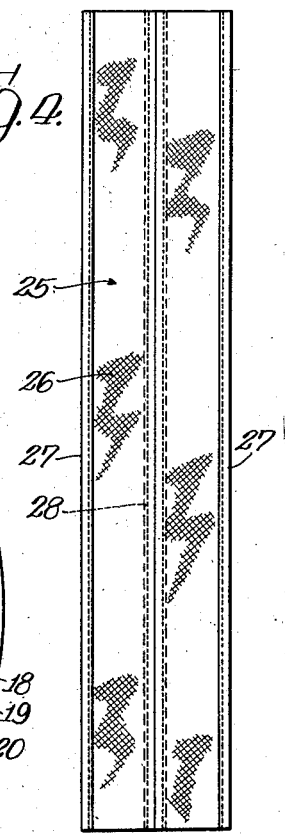
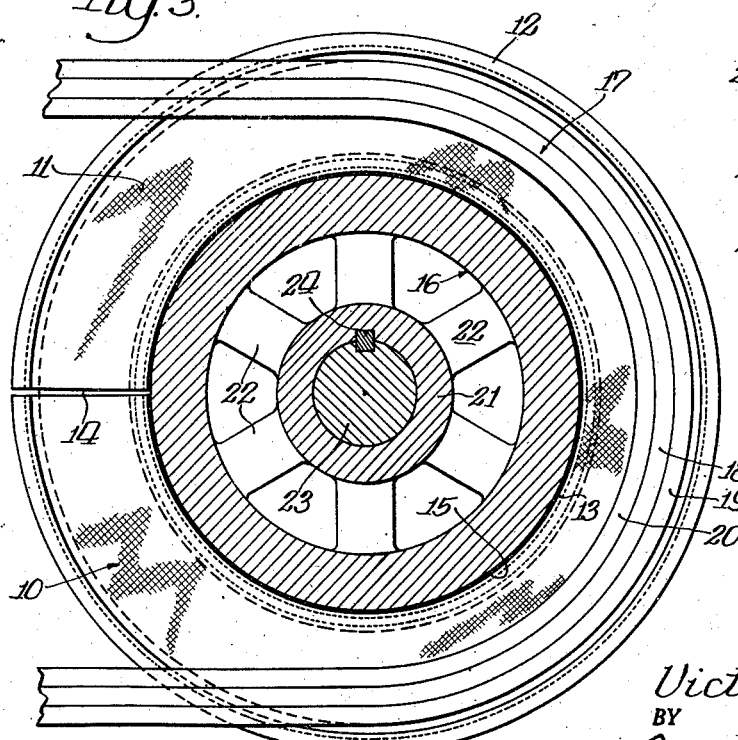
INVENTOR.
Victor R. Clark,
BY
Brown, Jackson, Boettcher & Dienner
Atty's Aug. 19, 1947.  V. R. CLARK  2,425,785
MEANS FOR AND METHOD OF APPLYING MULTIPLE-BELTS
Filed June 24, 1943  2 Sheets-Sheet 2
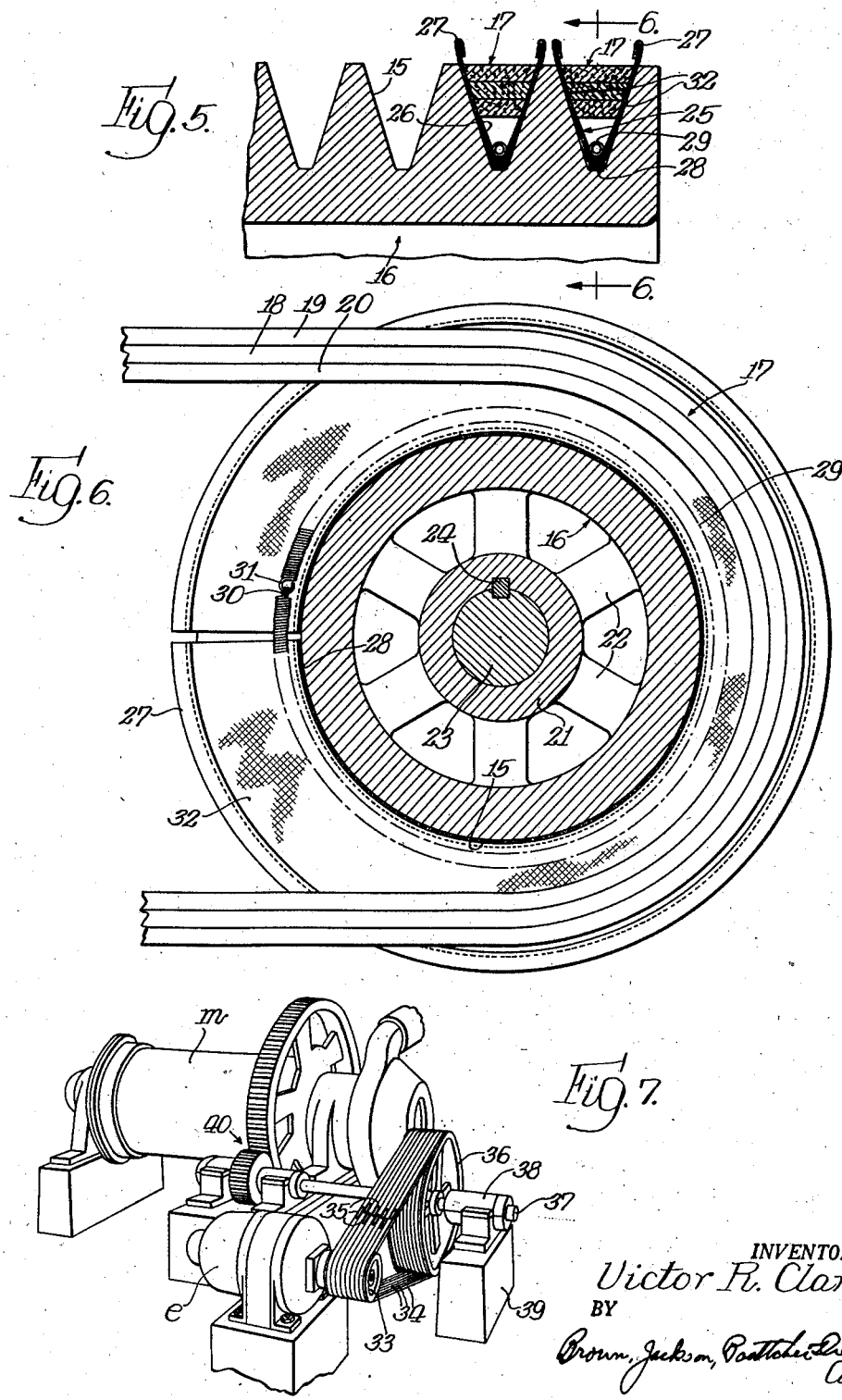
INVENTOR.
Victor R. Clark,
BY
Brown, Jackson, Boettcher & Dienner
Atty's.

Patented Aug. 19, 1947

2,425,785

UNITED STATES PATENT OFFICE 2,425,785

MEANS FOR AND METHOD OF APPLYING MULTIPLE BELTS

Victor R. Clark, Chicago, Ill.

Application June 24, 1943, Serial No. 492,046

11 Claims. (Cl. 74—230.7)

This invention relates to installing power transmission belts, and has to do with the applying of a plurality of belts to associated multiple grooved pulleys to provide a multiple belt drive therebetween.

My invention has particular application to multiple V-belt drives and will be described as used for installing the belts of such a drive, though in its broader aspects my invention may be used to advantage in installing the belts or analogous members of a multiple drive comprising multiple grooved pulleys and belt members engaging in the grooves of the pulleys for establishing a multiple belt drive therebetween.

In order to transmit power, a belt must be under some elastic tension when applied. The ability of a driven belt to transmit power is measured by the difference between the tension of the pulling or tight side of the belt and the tension of the slack side thereof. It is the practice, when it is desired to transmit more power than the capacity of one V-belt, to employ multiple grooved pulleys and a plurality of belts engaging in the grooves of the pulleys, providing a multiple V-belt drive. In installing such a drive, the common practice is to use V-belts each molded or shaped as a continuous endless belt of a predetermined size, selecting the proper number of such belts and matching them as closely as possible for exact endless length. Such a set of belts is known as a set of matched endless V-belts. In order to install a set of belts it is frequently necessary to dismantle the machines or the shafting supports, such, for example, as outboard bearing supports for the shafts, which is objectionable as incurring considerable lost time in the operation of the machine, which is of necessity stopped during installing of the belts, in addition to the labor costs and further delay often incurred in properly realigning the parts after the belts have been installed.

It is known to provide V-belting in comparatively long lengths, from which suitable lengths may be cut and the ends thereof secured together by a suitable fastener or coupling device to provide a nendless V-belt. When installing such a belt, after it has been placed about the pulleys, the ends of the belt are pulled together, by means of a suitable clamping and tensioning device, known as an installation clamp, provided with a turnbuckle or equivalent means for pulling the ends of the belting toward each other and holding them in proper relation while the belt fastener or coupling device is secured to the ends of the belt, thus completing the belt and installation thereof about the pulleys. This method of installing a single V-belt about a pair of single grooved pulleys is feasible because the pulleys are free to turn during stretching of the belt therearound preparatory to securing together of the ends of the belt. In cases where the pulleys are mounted for relative adjustment toward and away from one another, one of the pulleys may be adjusted toward the other, and the belt, with its ends secured together, may be placed loosely about the pulleys, after which the adjustable pulley may be moved away from the other pulley for properly tensioning the belt. The method above referred to of applying the belt to the pulleys, by stretching it about them and securing the ends of the belt together, is applicable particularly to those cases in which the pulleys are a fixed distance apart and not capable of relative adjustment, though in many instances it may be used to advantage where the pulleys are capable of relative adjustment, as maintaining the accurate alignment of the pulleys which might be disturbed by adjustment of one or both thereof.

While it is feasible to apply a single V-belt to a pair of pulleys by stretching the belt around the pulleys and securing the ends of the belt together, in the manner above referred to, it is not possible, under the present practice, to apply a plurality of belts to a pair of multiple grooved pulleys in that manner so as to produce an efficient drive between the pulleys. The grip of the respective belts in the grooves of the pulleys must be adquate to deliver the required power, after the belt has been installed. The first installed belt grips both of the pulleys tightly, and, when neither of the pulleys is driven, prevents either pulley from turning. Since it is necessary for the second belt to match the first belt for tension and, therefore, exact length, a second belt cannot be installed because it would also grip both of the pulleys tightly and, since the pulleys are held against turning movement, the run of the second belt at which the fastener is applied would have to be abusively elongated to compensate for the inability to tension the opposite run. If cut long enough to permit the fastener to be applied without abusive tension, the second belt would be under too light a tension to absorb its part of the load. The same would be true of succeeding belts if applied to the pulleys, to complete the multiple belt drive. It is because of this impossibility, under the present practice, of obtaining uniform tension of the belts of a multiple V-belt drive, when the belts are cut to length and secured together about the pulleys, that the practice of providing sets of matched endless belts, which are applied to the pulleys by disassembling the machine or parts thereof, in many instances, has become the usual practice and is generally accepted as a necessary evil.

I have found that the difficulties above referred to with respect to installing a multiple drive V-belt by cutting the belts to length and securing them about the pulleys can be avoided by providing means whereby the belts, when initially installed, exert very little, if any, gripping effect upon the pulleys, permitting ready turning thereof during the tensioning of the belts about the pulleys while installing them. That renders it unnecessary to dismantle the machines or the shafting supports, such as the outboard bearing structures for shafts, when installing a plurality of belts in a multiple belt drive, which is advantageous for obvious reasons. More specifically, I provide an insert or equivalent member which is disposed between a belt and the pulley groove receiving that belt, and is of such character as to present practically no frictional gripping effect to the pulley surface, so as to slip readily in the pulley groove. In that manner I assure that, when the belts are initially installed, the pulleys and the belts are free for relative movement. The insert or equivalent means may be applied to either one or both of the pulleys, and are formed of quite thin material so that, when removed, the belts are under proper tension for transmitting the desired power. Further objects and advantages of my invention will appear from the detail description.

In the drawings:

Figure 1 is a side view of an insert embodying my invention, suitable for use in applying V-belts to pulleys;

Figure 2 is a fragmentary sectional view of a multiple grooved pulley, taken lengthwise or in the direction of the axis thereof, showing two inserts and two belts applied to the pulley in accordance with my invention;

Figure 3 is a sectional view taken substantially on line 3—3 of Figure 2, with the belt shown in elevation;

Figure 4 is a plan view of another form of insert suitable for installing the belts of a multiple V-belt drive in accordance with my invention;

Figure 5 is a view similar to Figure 2 but illustrating the use of inserts similar to that of Figure 4;

Figure 6 is a sectional view taken substantially on line 6—6 of Figure 5, with the belt and the garter retaining spring for the insert shown in elevation; and Figure 7 is a perspective side view of a rod mill and a multiple V-belt drive therefor, installed in accordance with my invention.

Referring to Figures 1 to 3, inclusive, I provide inserts 10 of annular form in side view, each comprising two arms 11 the outer edges of which are turned over and stitched down to provide outer circumferential reenforcements 12. A reenforcing strip 13 is secured to the central portion of insert 10, conveniently by stitching, and insert 10 is cut from one side and for its full width at 14. This insert 10 is of proper diameter to fit within pulley groove 15 of a multiple grooved pulley 16 of known type. When the insert 10 is applied to groove 15 it is spread open at its upper or outer portion for reception of a V-belt 17 as shown in Figure 2. The V-belt 17 may be of any suitable type, but preferably is constructed similarly to the V-belt disclosed in my copending application for V-belt and fastener, Serial No. 453,771, filed August 6, 1942, now Patent No. 2,363,043, dated Nov. 21, 1944. This belt comprises a center ply 18 of leather which is stress resistant and carries the load, and top and bottom plies 19 and 20, respectively, of comparatively soft and elastic leather which is readily stretchable and compressible to conform to the curvature of the pulley and is of a character to grip frictionally the pulley surfaces. The insert 10 is made of a material which has an extremely low coefficient of friction and will readily slip in contact with the contacting surfaces of the pulley groove 15. I find that oiled silk is very satisfactory for the insert 10, though it may be made of other suitable material, oiled rayon being also quite efficient and, in some cases, waxed paper or waxed fabric may be used. I find that applying a light coating of a suitable lubricant, such as a light oil, to the outer surfaces of the insert 10, that is, those surfaces of the insert which contact the walls of the groove 15, is advantageous in certain cases as assuring ready slippage between the insert and the pulley.

In order to install a multiple-belt drive in accordance with my invention, an insert 10 is placed in one of the grooves 15 of the pulley 16, after which the belt 17, cut to proper length, is placed within the pulley groove 15, within the insert 10, and is passed about the other pulley, in the corresponding groove thereof, the belt being then tensioned about the pulleys and having its ends secured together by a suitable belt fastener or coupling device in the manner previously described. Preferably, I use the belt fastener disclosed in my above identified copending application, though any other suitable belt fastener may be used. In applying the first belt, no difficulty is encountered, since at that time the pulleys are not held against turning movement and will turn during tensioning of the belt thereabout. The second belt is then installed in the same manner. During installation of the second belt the pulley 16 turns freely to accommodate tensioning of that belt, since the insert 10 associated with the first installed belt exerts no effective friction on the pulley 16. In like manner, the succeeding belts are installed until the multiple-belt drive has been completed, pulley 16 in each instance being free to turn due to the presence of the insert 10 associated with the respective belts. After all of the belts have been installed, the inserts 10 are removed by grasping each thereof at one end adjacent the cut 14 and turning the pulley 16 while withdrawing the insert 10 from the pulley groove 15. If oil or other lubricant has been applied to the outer surfaces of the insert 10, such lubricant preferably is wiped from the grooves of the pulley, though that is not essential since the lubricant is present in but small amount and is readily absorbed by the leather of the belt, assuming the belt used is formed of leather as above described. If a different type of belt is used, such as a rubber V-belt, the lubricant preferably is wiped from the grooves of the pulley. Briefly, in installing a multiple belt drive in accordance with my invention, I cut predetermined lengths of belting, suitable for the desired belts, tension these lengths of belting successively about the pulleys, with an insert or slippage providing means interposed between the belting and one or both of the pulleys, secure together the ends of the length of belting thereby completing the belt, and after all of the belts have been thus tensioned and secured about the pulleys remove the inserts or slippage providing means for establishing friction driving connection between each of the belts and both of the pulleys about which it passes.

If desired, inserts 10 may be placed in the grooves of both of the multiple grooved pulleys, when installing the belts, though ordinarily that is not necessary and it is sufficient if there is freedom of relative movement between one of the pulleys and the belt. While I have referred to the pulley 16 as turning to accommodate the stretching of the belt during installation thereof, it will be understood that there may also be movement of the belt about the pulley, due to the slippage provided therebetween by the insert, for the same purpose. It will be seen that by permitting free slippage between the pulley and the belts, it is possible to apply a plurality of belts to a pair of multiple grooved pulleys so as to provide a multiple V-belt drive therebetween, in such manner as to avoid unequal stretching of the belts, thus assuring that the belts are under the same tension and, when the inserts 10 have been removed, exert equal gripping effect on the pulleys for establishing a drive therebetween, assuring that the load is uniformly distributed between the belts. The inserts 10 are shown in Figures 2 and 3 as being formed of material of much greater thickness than is actually used, for clearness of illustration. In practice, the oiled silk or other material used is quite thin, comparable to tissue paper, and removal of the insert has no detectable effect upon the tension of the belt.

In Figure 3 I have shown the pulley 16 as provided with a hub 21 connected to the body of the pulley by radial arms or spokes 22, this hub receiving a shaft 23 to which it is locked by a key 24 in a known manner.

In Figure 4 I have shown a second form of insert 25 comprising an elongated rectangular strip 26 of oiled silk or other suitable material, turned over and stitched at its marginal portions to provide reenforcing elements 27, and having a relatively narrow reenforcing strip 28 stitched to its central portion. In applying insert 25 to groove 15 of pulley 16, I preferably provide a garter tension spring 29 having at one end a loop 30 receiving a hook 31 at the other end of this spring. Spring 29 is of such length that when the ends thereof are hooked together, it is positioned in the lower or inner portion of groove 15 under slight tension, sufficient to hold insert 25 within groove 15, disposed to provide two upwardly or outwardly converging arms 32, the insert 25 being then of V shape in cross section conforming to the groove 15. The belt 17 is disposed between the arms of the insert 25, as shown in Figure 5, there being an insert 25 placed in each groove 15 of the pulley and the belts being successively applied to the pulleys in the manner previously described in connection with Figure 2. The spring 29 exerts no appreciable gripping effect, and the inserts 25 provide for free slippage between the belt and the pulley. After the belts have all been installed, the springs 29 are removed and the inserts 25 are also removed from the grooves 15 of the pulley 16, the belts 17 then establishing driving connection between the pulleys.

In Figure 7 I have shown a rod mill $m$ driven by an electric motor $e$ through a multiple V-belt drive comprising a multiple grooved pulley 33 secured on the motor shaft and connected by a plurality of belts 34, each including a fastener 35, to a multiple grooved pulley 36 secured on a shaft 37. The outer portion of shaft 37 is mounted in an outboard bearing structure 38 carried by a supporting block 39, and this shaft has driving connection, through gearing 40, to the mill $m$. It will be seen that in order to apply a set of matched preformed endless belts to the pulleys 33 and 36 of Figure 7, it would be necessary to dismantle the outboard bearing structure for shaft 37, which in practice would involve considerable delay and labor. By employing the inserts of my invention, or equivalent means, in association with either or both of the pulleys 33 and 36, it is possible to install the necessary number of belts to complete the drive, in an entirely satisfactory manner and without necessity of dismantling the outboard bearing structure for the shaft 37, by cutting the belts to length and tensioning them about the pulleys and securing the ends of the belts together, in the manner previously described. That effects a material saving in time in installing the belts of the multiple V-belt drive, compared to the present practice above referred to, thus materially reducing the time in which the rod mill $m$ remains out of operation, while also effecting a material saving in time and cost which would be involved in dismantling and replacing the outboard bearing structure for the shaft 37.

As above indicated, it will be understood that variations may be resorted to in practicing my invention without departing from the field and scope thereof, and I intend to include all such variations, as fall within the scope of the appended claims, in this application in which the preferred forms only of my invention have been disclosed.

I claim:

1. In means for installing belts about multiple grooved pulleys to provide a multiple belt drive therebetween, an insert comprising a strip of readily pliable material of but slight thickness adapted to be positioned in a groove of a pulley and to conform substantially to the cross section of the groove so as to provide outwardly diverging arms disposed at the sides of the groove, said insert being formed of a material having a low coefficient of friction assuring ready slippage between the insert and the pulley when the arms of the insert are pressed against the sides of the groove by a belt tensioned about the pulley, and an elastic retaining member detachably connected at its ends disposed in the inner portion of the groove and retaining the insert therein.

2. In means for installing belts on multiple grooved pulleys to provide a multiple belt drive therebetween, an insert adapted to be positioned in and to conform substantially to a pulley groove so as to provide outwardly diverging arms disposed at the side walls of the groove, and an elastic retaining member detachably connected at its ends fitting about the pulley at the inner portion of the groove thereof and retaining the insert therein, said insert being formed of a material having a low coefficient of friction assuring ready slippage between the pulley and the insert when the arms thereof are pressed against the side walls of the groove by a belt tensioned about the pulley.

3. The method of installing belts on multiple grooved pulleys to provide a multiple belt drive therebetween, which comprises placing between each belt when it is initially installed and the corresponding groove of one of the pulleys means assuring ready slippage between the belt and the pulley, retaining said means in position until all of the belts have been installed, thereby assuring ready slippage between all of the belts and at least one of the pulleys to accommodate tensioning of the respective belts during installing thereof, and removing said slippage providing means after all of the belts have been installed.

4. A method of installing belts on multiple grooved pulleys to provide a multiple belt drive therebetween, which comprises cutting predetermined lengths of belting to be formed into belts by securing their ends together, tensioning the respective lengths of belting about the pulleys with means interposed between each length of belting and its corresponding pulley groove assuring ready slippage between the belting and the pulley and securing the ends of the respective lengths of belting together thereby completing the belts about the pulleys, and thereafter removing the slippage providing means for establishing driving friction contact between the respective belts and the pulleys.

5. The method of applying belts to multiple grooved pulleys to provide a multiple belt drive therebetween, which comprises cutting predetermined lengths of belting, disposing the lengths of belting about the pulleys with means between the respective belting lengths and the corresponding grooves of one of the pulleys assuring ready slippage between the pulley and the belting lengths when the latter are tensioned about the pulleys, tensioning the respective belting lengths about the pulleys and securing their ends together to provide belts extending about the pulleys while retaining the slippage providing means whereby assuring slippage between one of the pulleys and the respective belting lengths to accommodate tensioning thereof, and thereafter removing the slippage providing means to establish driving friction contact between the belts and both of the pulleys.

6. The method of applying belts to multiple grooved pulleys to provide a multiple belt drive therebetween which comprises placing predetermined lengths of belting about the pulleys with inserts between the respective belting lengths and the corresponding grooves of one of the pulleys assuring ready slippage between the pulley and the respective belting lengths when the latter are tensioned about the pulleys, tensioning the belting lengths about the pulleys and securing their ends together providing belts extending about the pulleys, and thereafter removing the inserts thereby providing driving friction contact between the belts and both of the pulleys.

7. As a new article of manufacture, an insert intended for use in installing belts on multiple grooved pulleys to provide a multiple belt drive therebetween by placing in the respective grooves of one of the pulleys an insert conforming substantially to the cross-sectional contour of the pulley groove with the belt in pressure contact with the outer face of the insert and the latter providing slippage between the belt and the pulley when the belt is moved about the pulley in less pressure contact with the insert than the normal driving pressure contact between the belt and the pulley, said insert being formed of a length of a pliable material of a character to assume readily desired cross sectional contour having its ends free from each other and having a coefficient of friction sufficiently low to assure ready slippage between said insert and a smooth metal surface in pressure contact therewith.

8. As a new article of manufacture, an insert intended for us in installing belts on multiple grooved pulleys to provide a multiple belt drive therebetween by placing in the respective grooves of one of the pulleys an insert conforming substantially to the cross-sectional contour of the pulley groove with the belt in pressure contact with the outer face of the insert and the latter providing slippage between the belt and the pulley when the belt is moved about the pulley in less pressure contact with the insert than the normal driving pressure contact between the belt and the pulley, said insert comprising two arms formed of a pliable material connected at their inner edges and disposable in diverging relation defining between them a space of substantially V-shape in cross section, said insert having its ends free from each other and having a coefficient of friction sufficiently low to assure ready slippage between said insert and a smooth metal surface in pressure contact therewith.

9. As a new article of manufacture, an insert intended for use in installing belts on multiple grooved pulleys to provide a multiple belt drive therebetween by placing in the respective grooves of one of the pulleys an insert conforming substantially to the cross-sectional contour of the pulley groove with the belt in pressure contact with the outer face of the insert and the latter providing slippage between the belt and the pulley when the belt is moved about the pulley in less pressure contact with the insert than the normal driving pressure contact between the belt and the pulley, said insert being of substantially annular form comprising two arms connected at their inner edges and disposable in diverging relation defining between them a space of substantially V-shape in cross section, said insert having its ends free from each other and having a coefficient of friction sufficiently low to assure ready slippage between said insert and a smooth metal surface in pressure contact therewith.

10. As a new article of manufacture, an insert intended for use in installing belts on multiple grooved pulleys to provide a multiple belt drive therebetween by placing in the respective grooves of one of the pulleys an insert conforming substantially to the cross-sectional contour of the pulley groove with the belt in pressure contact with the outer face of the insert and the latter providing slippage between the belt and the pulley when the belt is moved about the pulley in less pressure contact with the insert than the normal driving pressure contact between the belt and the pulley, said insert being formed of a length of a thin tough pliable fabric of a character to assume readily desired cross sectional contour having its ends free from each other and having a coefficient of friction sufficiently low to assure ready slippage between said insert and a smooth metal surface in pressure contact therewith.

11. As a new article of manufacture, an insert intended for use in installing belts on multiple grooved pulleys to provide a multiple belt drive therebetween by placing in the respective grooves of one of the pulleys an insert conforming substantially to the cross-sectional contour of the pulley groove with the belt in pressure contact with the outer face of the insert and the latter providing slippage between the belt and the pulley when the belt is moved about the pulley in less pressure contact with the insert than the normal driving pressure contact between the belt and the pulley, said insert being formed of a length of a thin tough pliable fabric of a character to assume readily an annular form defining a groove of substantially V-shaped cross section, said insert having its ends free from each other and having a coefficient of friction sufficiently low to assure ready slippage between said insert and a smooth metal surface in pressure contact therewith, and a retaining member in the form of a length of elastic material positionable about said insert at the bottom of said groove, said member having means detachably securing its ends together and being of an effective circumference, when free of tension, appreciably less than the circumference of said insert at the bottom of the groove thereof.

VICTOR R. CLARK.

REFERENCES CITED

The following references are of record in the file of this patent:

UNITED STATES PATENTS

| Number | Name | Date |
|---|---|---|
| 522,466 | Gunther | July 3, 1894 |
| 1,318,766 | Keith | Oct. 14, 1919 |
| 438,250 | Diescher | Oct. 14, 1890 |